United States Patent
Biswas et al.

(10) Patent No.: US 9,721,105 B2
(45) Date of Patent: Aug. 1, 2017

(54) METHOD AND APPARATUS FOR GENERATING PRIVACY RATINGS FOR APPLICATIONS

(75) Inventors: Debmalya Biswas, Lausanne (CH); Gian Paolo Perrucci, Lausanne (CH); Imad Aad, Préverenges (CH)

(73) Assignee: Nokia Technologies Oy, Espoo (FI)

( * ) Notice: Subject to any disclaimer, the term of this patent is extended or adjusted under 35 U.S.C. 154(b) by 1167 days.

(21) Appl. No.: 13/352,886

(22) Filed: Jan. 18, 2012

(65) Prior Publication Data

US 2013/0185804 A1    Jul. 18, 2013

(51) Int. Cl.
*H04L 9/00* (2006.01)
*G06F 21/57* (2013.01)

(52) U.S. Cl.
CPC ...... *G06F 21/577* (2013.01); *G06F 2221/033* (2013.01)

(58) Field of Classification Search
CPC .................. G06F 21/577; G06F 2221/033
USPC ........................................................ 726/26
See application file for complete search history.

(56) References Cited

U.S. PATENT DOCUMENTS

| 2002/0173295 | A1* | 11/2002 | Nykanen et al. | 455/414 |
| 2004/0176104 | A1* | 9/2004 | Arcens | 455/456.3 |
| 2010/0077484 | A1* | 3/2010 | Paretti et al. | 726/26 |

OTHER PUBLICATIONS

Disconnect, web page, 3 pages, dated Aug. 20, 2012, https://db.disconnect.me/sites/.

* cited by examiner

*Primary Examiner* — Beemnet Dada
(74) *Attorney, Agent, or Firm* — Ditthavong & Steiner, P.C.

(57) ABSTRACT

An approach is provided for generating privacy ratings for applications. A privacy ratings platform determines use information associated with one or more applications executing on one or more devices. By way of example, the use information is determined based, at least in part, on usage data associated with one or more input sources, one or more components, one or more categories of personal information, or a combination thereof associated with the one or more devices. The privacy ratings platform then processes and/or facilitates a processing of the use information to determine one or more privacy ratings for the one or more applications.

18 Claims, 9 Drawing Sheets

METHOD AND APPARATUS FOR GENERATING PRIVACY RATINGS FOR APPLICATIONS

BACKGROUND

Service providers and device manufacturers (e.g., wireless, cellular, etc.) are continually challenged to deliver value and convenience to consumers by, for example, providing compelling network services and applications. As a result, there has been increasingly rapid growth in the number and variety of applications available to users. However, the growing popularity of applications has also made them popular targets for malicious attacks that can compromise the privacy of user data accessed by applications. Accordingly, users are becoming more interested in privacy related information about particular applications to help them decide whether they should use or otherwise trust such applications with their personal data. To meet this need, service providers and device manufacturers face significant technical challenges to ensuring that individual applications can be assigned privacy ratings that are accurate while also minimizing the burden on users when generating the ratings.

SOME EXAMPLE EMBODIMENTS

Therefore, there is a need for an approach for generating privacy ratings for applications.

According to one embodiment, a method comprises determining use information associated with one or more applications executing on one or more devices. By way of example, the use information is determined based, at least in part, on usage data associated with one or more input sources, one or more components, one or more categories of personal information, or a combination thereof associated with the one or more devices. The method also comprises processing and/or facilitating a processing of the use information to determine one or more privacy ratings for the one or more applications.

According to another embodiment, an apparatus comprises at least one processor, and at least one memory including computer program code for one or more computer programs, the at least one memory and the computer program code configured to, with the at least one processor, cause, at least in part, the apparatus to determine use information associated with one or more applications executing on one or more devices. By way of example, the use information is determined based, at least in part, on usage data associated with one or more input sources, one or more components, one or more categories of personal information, or a combination thereof associated with the one or more devices. The apparatus is also caused to process and/or facilitate a processing of the use information to determine one or more privacy ratings for the one or more applications.

According to another embodiment, a computer-readable storage medium carries one or more sequences of one or more instructions which, when executed by one or more processors, cause, at least in part, an apparatus to determine use information associated with one or more applications executing on one or more devices. By way of example, the use information is determined based, at least in part, on usage data associated with one or more input sources, one or more components, one or more categories of personal information, or a combination thereof associated with the one or more devices. The apparatus is also caused to process and/or facilitate a processing of the use information to determine one or more privacy ratings for the one or more applications.

According to another embodiment, an apparatus comprises means for determining use information associated with one or more applications executing on one or more devices. By way of example, the use information is determined based, at least in part, on usage data associated with one or more input sources, one or more components, one or more categories of personal information, or a combination thereof associated with the one or more devices. The apparatus also comprises means for processing and/or facilitating a processing of the use information to determine one or more privacy ratings for the one or more applications.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for generating privacy ratings for applications are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
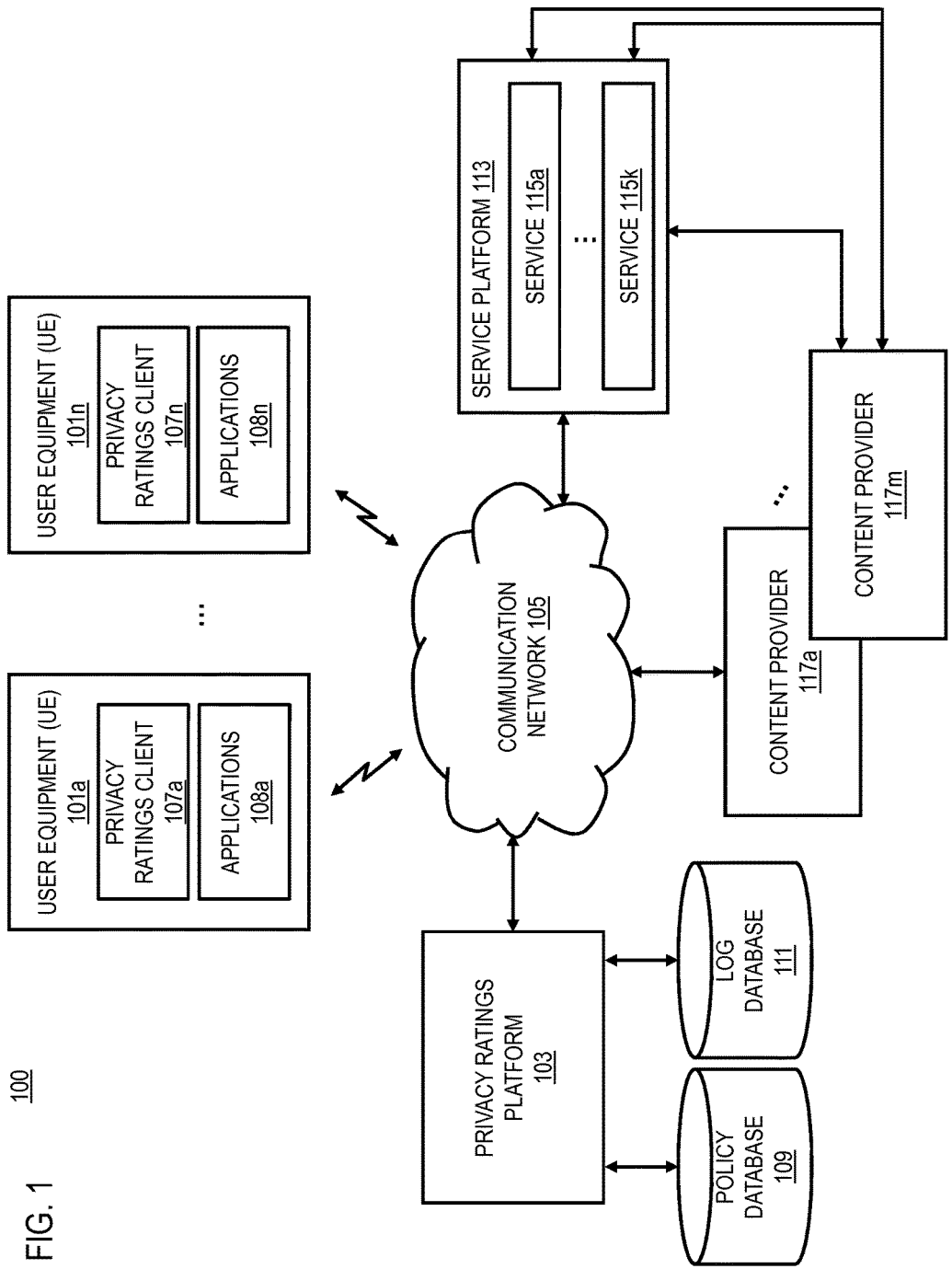
FIG. 1 is a diagram of a system capable of generating privacy ratings for applications, according to one embodiment.

FIG. 1 is a diagram of a system capable of generating privacy ratings for applications, according to one embodiment. As discussed above, with growing privacy awareness among users, users are interested in learning about the privacy features of applications before deciding to install them on their devices (e.g., a mobile phone). In some cases, it is expected that privacy may become a differentiating feature that affects user acceptance of applications. It is further contemplated that privacy considerations may become as importance a factor for application acceptance as other functions aspects of applications (e.g., performance, usability, etc.).

From the user's point of view, the problem is that there are no reliable sources to get privacy related information about applications. Traditionally, the application developer is often the most knowledgeable about an application's features, and in the ideal scenario, should provide comprehensive privacy related information about the application. However, it is often the case that there is not enough information to determine the trustworthiness of specific application developers. Service providers and device manufacturers (e.g., Nokia, Apple, Microsoft, etc.) have also tried to address the trust issue by implementing, for instance, a centralized certification mechanism where an application is reviewed for privacy/security issues before publishing the application to online application stores.

While this act is a deterrent to privacy abuses or attacks, it does not solve the problem because (1) three have been numerous instances where malicious applications have been able to bypass such centralized checks, and (2) users do not fully trust the service providers and device manufacturers to also provide unbiased ratings information. It is often the case that users are more likely to trust application reviews from their friends rather than from third parties (e.g., service providers and device manufacturers). Accordingly, for many users, crowdsourcing or peer comments regarding privacy/security ratings for applications may be preferred as a means for unbiased feedback. Unfortunately, such crowdsourcing ratings information is often not readily available, and whatever little information that is available may not be reliable enough.

To address this problem, a system 100 of FIG. 1 introduces a privacy ratings framework that computes privacy ratings in a crowdsourced fashion (e.g., using information from multiple devices or users) with minimum burden on the users. In one embodiment, the system 100 automatically collects application use information (e.g., information regarding what device resources, input, content, data, etc. are used by particular applications) to compute the privacy ratings so that users need go through the burden of manually entering such information. For example, traditional ratings systems often require users to provide their input manually. However, users are generally reluctant to do things (e.g., provide manual ratings) without any incentive (e.g., financial incentive), or which does not give them immediate benefit. The system 100 overcomes this problem by collecting the data (e.g., application use information) required for conducting a privacy review in an automated fashion.

In some embodiments, the system 100 then presents the privacy ratings to users in a well quantifiable and understandable form (e.g., a simple rendering or visualization of the privacy ratings). For example, traditional free-text based reviews or ratings have been very popular. However, privacy as a concept is still in its infancy, and does not have a well understood vocabulary for users to express their privacy-related experiences with applications. This can prevent users from expressing their opinions in a way that can be universally and correctly be understood other users. To address this problem, the system 100 transforms application use information, privacy ratings, etc. using a well-defined privacy model into a privacy representation that can be understood by most users (e.g., a common visual representation).

In another embodiment, the system 100 can customize the privacy ratings for specific target devices based, for instance, on their respective environments, usage, context, etc.). In yet another embodiment, the system 100 enables the privacy ratings to evolve over time as additional application use information is collected from user devices. For example, traditional crowdsourced reviews are typically one-time reviews which remain static once uploaded or published. To address this problem, the system 100 provides for automated collection of application use information and/or other privacy related data over time. This type of data collection enables, for instance, this system 100 to capture changes in application use over time that can, in turn, affect privacy ratings over time, thereby providing a more realistic picture of evolving application usage as it relates to privacy.

As shown in FIG. 1, the system 100 comprises a user equipment (UE) 101 (or UEs 101a-101n) having connectivity to a privacy ratings platform 103 via a communication network 105. The UEs 101a-101n may include or have access to respective privacy ratings client 107a-107n (also collectively referred to as privacy ratings clients 107) which monitors and processes privacy ratings information associated with respective applications 108a-108n (also collectively referred to as applications 108). In one embodiment, the privacy ratings clients 107 enables the UEs 101 to interact with the privacy ratings platform 103 to: (a) collect application use information; (b) process the use information to compute or generate privacy ratings for the applications 108; (c) continuously or periodically monitor the use information over time to update privacy ratings; (d) present understandable representations of the privacy ratings; (e) customize the privacy ratings to specific devices, environments, contexts, etc.; (f) process data collection policies to determine specifications specifying data to log for compliance with the data collection policies; (g) install the specifications at the data stores operating under the data collection policies to initiate logging of the data; (h) process the data for comparison against the data collection policies, the specifications, etc., to determine the compliance with the data collection policies; (i) generate notifications, reports, etc., with respect to the compliance with the data collection policies; (j) or perform other functions.

The privacy ratings platform 103 may include or have access to a policy database 109 to access or store policy information (e.g., data collection policies, privacy policies, etc.) associated with users, devices, applications, data stores, etc. The privacy ratings platform 103 may also include or have access to a log database 111 to access or store data logs associated with the collection of application use data, the data collection policies, the auditing specifications, etc. Collected application use information or content may be obtained or stored at data stores located at the policy database 109, the log database 111, a service platform 113, one or more services 115 (or services 115a-115k), one or more content providers 117 (or content providers 117a-117m), and/or other services and applications available over the communication network 105. It is noted that the privacy ratings platform 103 may be a separate entity of the system 100, a part of the one or more services 115 of the service platform 113, or included within the UE 101 (e.g., as part of the application 107).

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the application use information may be processed and compared against the one or more data collection policies and/or the one or more specifications to determine the compliance with the one or more data collection policies. By way of example, data related to the one or more operations performed on the one or more data stores by one or more applications, one or more services, one or more third parties, etc., may be compared against one or more policy-monitored operations to determine whether the one or more performed operations are in compliance. In one scenario, the data collection policies associated with a particular data store may forbid transfers of collected user-identifiable information to third parties. As such, the data collection policies may require removal of collected user-identifiable information from a subset of collected user data prior to the transfer of that subset a third party. Accordingly, such data transfers to third parties may be monitored for user-identifiable information to determine compliance with the data collection policies. In one embodiment, the system 100 collects anonymized application use information that indicates application usage patterns without exposing identifying information associated with a UE 101 or a user o the UE 101.

In another embodiment, one or more notifications and/or one or more reports with respect to the compliance with the one or more data collection policies may be generated. In one use case, there may be various levels of treatment for different non-compliant operations. For example, transfers of user-identifiable information to third parties may be subject to a higher level of scrutiny, as compared with transfers of collection information that does not include any user-identifiable information. As such, a transfer of user-identifiable information to third parties (e.g., even transfers permitted by a high-level policy manager) may trigger a notification that includes information relating to the particular transfer to be generated and transmitted to all high-level policy managers. The information relating to the particular transfer may, for instance, include the policy officer who initiated the data transfer, the high-level policy manager who permitted the data transfer, the user-identification information included in the data transfer, the third party receiving the data transfer, etc. In one embodiment, the system 100 may use the compliance reports and/or notifications as a factor in computing the privacy ratings for a particular application. For example, multiple compliance violations may potentially lower an application's privacy rating.

In another embodiment, one or more contextual parameters associated with the application use information may be determined. The privacy ratings generated from the application use information may then be determined based on the one or more contextual parameters. By way of example, the one or more contextual parameters may include one or more temporal parameters, one or more location parameters, and/or one or more activity parameters. In one embodiment, the components used for collection application use information from the UEs 101 may include a time-based mechanism to enable or disable logging based on the temporal parameters.

By way of example, the UE 101, the privacy ratings platform 103, the service platform 113, the services 115, and the content providers 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2A:
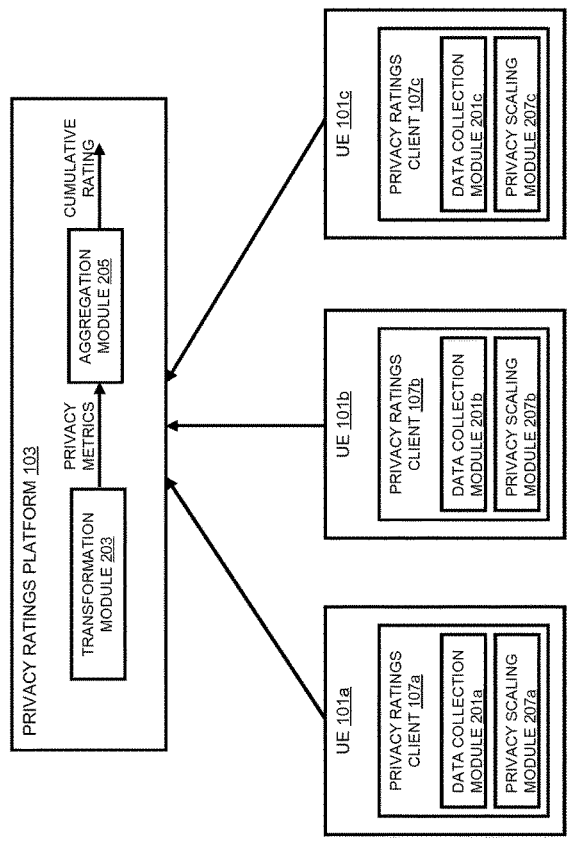
FIG. 2A is a diagram of the components of a privacy ratings platform, according to one embodiment.

FIG. 2A is a diagram of the components of a privacy ratings platform, according to one embodiment. FIG. 2A is described in combination with FIG. 2B which is a diagram depicting collection of use information associated with one or more applications, according to one embodiment. In this example, FIG. 2A depicts an architecture for automated crowdsourced privacy rating.

As shown, the privacy ratings platform 103 has connectivity to UEs 101a, 101b, and 101n which include respective privacy ratings clients 107a-107c. By way of example, the privacy ratings clients 107 include one or more components for generating and/or facilitating the generation of privacy ratings for applications. In one embodiment, the privacy ratings clients 107a-107c include respective data collection modules 201a-201c (also collectively referred to as data collection modules 201).

By way of example, the data collection modules 201 are responsible for collecting application use information and related data to support generation of privacy ratings. The application use information includes, for instance, application data that corresponds to usage data of the various input sources, components, categories of personal information, etc. available on the UEs 101. These sources, components, categories of personal information, etc. include, for instance, sensors (e.g., location sensors, accelerometers, gyroscopes, etc.), microphones, cameras, file systems, contact information, calendar information, among others. Such sources are usually accessed by middleware frameworks (e.g., Qt Mobility application programming interfaces (APIs)) by the applications. In one embodiment, the data collection module 201 inserts logging code into privacy sensitive middleware frameworks which log the application details each time a source is read (see description with respect to FIG. 2B). Logged details may include, for instance, timestamps, input source type, name of application accessing the source data, etc.

In another embodiment, in addition to sensor/source/category/etc. usage data, the user may also set policies (e.g., privacy and/or security policies) regulating the use of a UE 101's resources by the applications. In this case, the data collection module 201, may determine compliance information for the respective applications by checking whether the application comply with or violate any of the policies. The compliance information may then be used as a factor in computing privacy ratings for the applications (e.g., decrease privacy ratings for violations and/or increase privacy ratings for compliance).

In one embodiment, the data collection module 201 stores the application use information (e.g., logged data usage) locally at the UE 101 and uploads the application use information to the privacy ratings platform 103 for processing. In some embodiments, the data collection module 201 can encrypt the application use data for security reasons. As noted above, the application use data also contains information about the application behavior with respect to any set policies, particularly if any violations of those policies are determined. In one embodiment, the application use information is anonymized and does not contain any actual user data (e.g., the source data itself). In other words, the application use information indicates, for instance, what data or resources are accessed but not the data itself. In this way, the application use information is already "privacy safe" and anonymous.

Figure 2B:
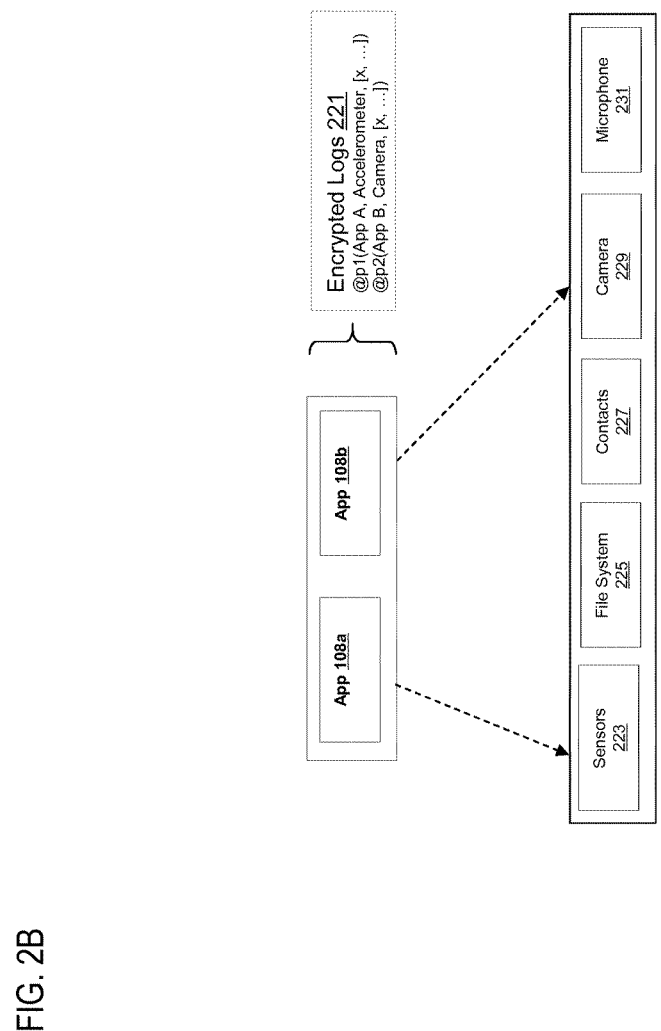
FIG. 2B is a diagram depicting collection of use information associated with one or more applications, according to one embodiment.

FIG. 2B is a diagram representing applications 108a and 108b executing at a UE 101 along with example device resources that the applications 108a and 108b may access. In this example, the resources include sensors 223, file system 225, contacts 227, camera 229, and microphone 231. FIG. 2B shows that application 108a has accessed the sensors 223 and the application 108b has accessed the camera 229. Accordingly, the data collection module 201 created logs 221 (e.g., encrypted logs) to record the respective accesses by the applications 108a and 108b. The encrypted logs 221 comprise, at least in part, the application use information collected by the data collection module 201.

Returning to FIG. 2A, the data collection modules 201 of the UEs 101 transmit their respective application use information to the privacy ratings platform 103. The privacy ratings platform 103 include one or more components for processing the application use information received from the data collection modules 201 to generate or compute cumulative privacy ratings for the applications. In one embodiment, the transformation module 203 of the privacy ratings platform 103 processes the application use information to transform the information based, at least in part, one or more user privacy metrics (e.g., the personal information or categories of personal information that can be inferred from the collected application use information). By way of example, personal information or categories of personal information can include user location, social connections, context, etc.

In one embodiment, the transformation is performed based, at least in part, on one or more profiling algorithms. One example algorithm may, for instance, process the number of accesses of input sources S1 and S2 with frequencies f1 and f2 to review a particular context C of the user. By way of example, the transformation module 203 may use a matrix that maps what personal information (e.g., Personal, Professional, Context, Social Connections, Location, Medical, Financial, etc.) can be inferred based on which sensors, information sources, input sources, etc. are accessed by a particular application. Note that each personal information category can include sever sub-categories. For example, the Context personal information category may include as sub-categories: Transportation means, Activity, Mood, etc. An example list of sensors, data sources, and input sources includes, but is not limited to: GPS, WiFi, BT, Cell ID, Call logs, SMS, Audio, Accelerometer, Address book, Calendar, Picture, Music, IMEI, IMSI, Device profile, Ring type, Battery (charge) level and Charging indicator. Accordingly, to infer a particular personal information category, the transformation module 203 can use the matrix to match the accessed sensors, data sources, input sources, etc. and determine the corresponding inferred personal information category listed in the matrix.

More specifically, in one embodiment, data from various sensors indicated in the application use information can be combined to infer personal information, using algorithms that can be simple (e.g., instant location), or have more complex access patterns (e.g., "Sensors S1 and S2 need to be accessed with frequencies f1 and f2 within time periods t1 and t2 to infer a context C."

In one embodiment, the privacy ratings platform 103 may generate individual privacy ratings for each of the privacy metrics. In other embodiments, the aggregation module 205 may combine the individual ratings for each privacy metric into a cumulative overall privacy rating for each of the applications. It is contemplated that the aggregation module 205 may use any process, method, algorithm, etc. to combine the individual privacy ratings. For example, each metric (e.g., user location, social connections, etc.) may be assigned a different weighting factor and the aggregation of the individual ratings for each metric may performed according to the weighting factors.

In one embodiment, the data collection modules 201 are collecting and/or uploading the application use information to the privacy ratings platform 103 continuously or periodically over one or more periods of time. Accordingly, the privacy ratings platform 103 can also update the computed privacy ratings for the applications at least substantially continuously or periodically.

In one embodiment, the privacy ratings computed above represent, for instance, the privacy risks as would be experience by users in general. In other words, the ratings are based on cumulative application use information (e.g., application access patterns), and may not necessarily represent the actual risks as would be experienced by a specific user having specific characteristics (e.g., device characteristics, data characteristics, application characteristics, environmental characteristics, etc.).

For instance, consider the location-based scenario described herein. Let application A access user U's location with frequency f. This information is logged and provided to the privacy ratings platform 103 which computes its privacy rating for A based on this and similar data received from other users. The privacy ratings platform 103 implicitly assumes that A actually received the location information it asked for with a certain accuracy. In reality, A may have received U's location information with very low accuracy, considerably reducing the privacy risks posed by A. This may be due to U's current location where, for instance, (1) GPS is not available, (2) high accuracy sensors are not supported by U's phone model, (3) etc.

Given this scenario, the privacy ratings computed by the privacy ratings platform 103 can be considered the worst case scenario where the privacy ratings platform 103 assumes that all access requests succeeded with the highest possible accuracy. It is contemplated that other normalization models are also possible. In one embodiment, the data collection module 201 does not provide this type of information (e.g., "accuracy of received data") to the privacy ratings platform 103 because accuracy information can also be considered as private information (e.g., can reveal information about the user's environment, financial status, etc.).

To overcome this limitation, the system 100 can implement a distributed framework whereby one or more functions of the privacy ratings platform 103 can be performed locally at the privacy ratings clients 107 (e.g., via the privacy scaling modules 207a-207c). Under this distributed framework, the data collection module 201 works as before logging and providing "privacy-safe" application use information to the privacy ratings platform 103. The privacy ratings platform 103 then computes the generic privacy ratings as before utilizing the transformation module 203 and the aggregation module 205. In one embodiment, the privacy scaling modules 207a-207c in addition to storing data about access requests made by an application (e.g., as stored by the data collection module 201), also maintains metadata about the corresponding responses to the access requests. By way of example, the response metadata consists of parameters (e.g., accuracy, input sensor, etc.) used while computing the returned value or response to the access request. This in turn determines the quality of the actual data received by the application, and hence the risk posed by that application. Based on this data, the privacy scaling modules 207a-207c, on retrieving the generic privacy rating of an application (e.g., from an application store), applies a scaling function to customize the rating specific to the user environment and/or characteristics of the device, environment, application, data, etc. before displaying the application's privacy ratings to the user.

Figure 3:
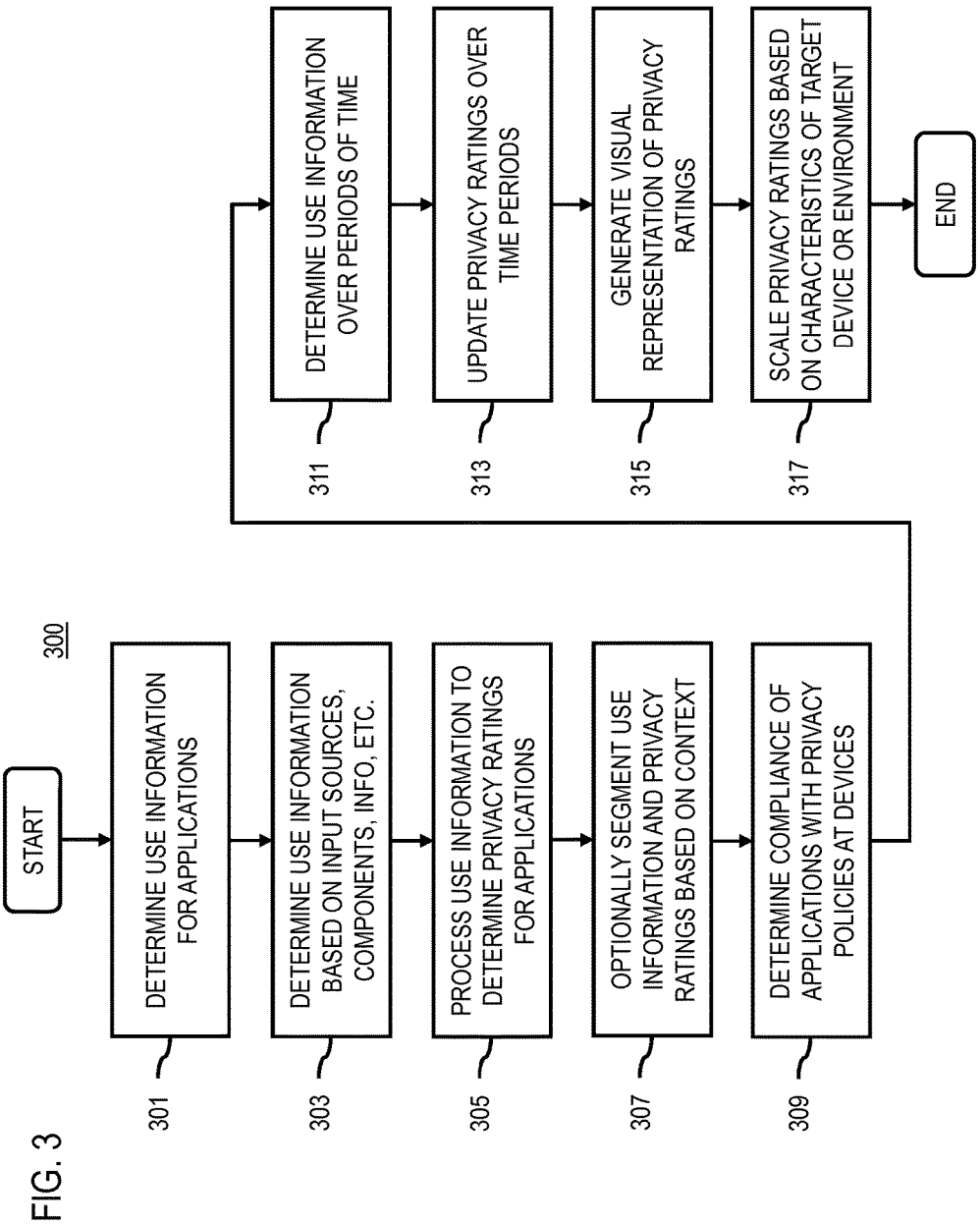
FIG. 3 is a flowchart of a process for generating privacy ratings for applications, according to one embodiment.
Figure 7:
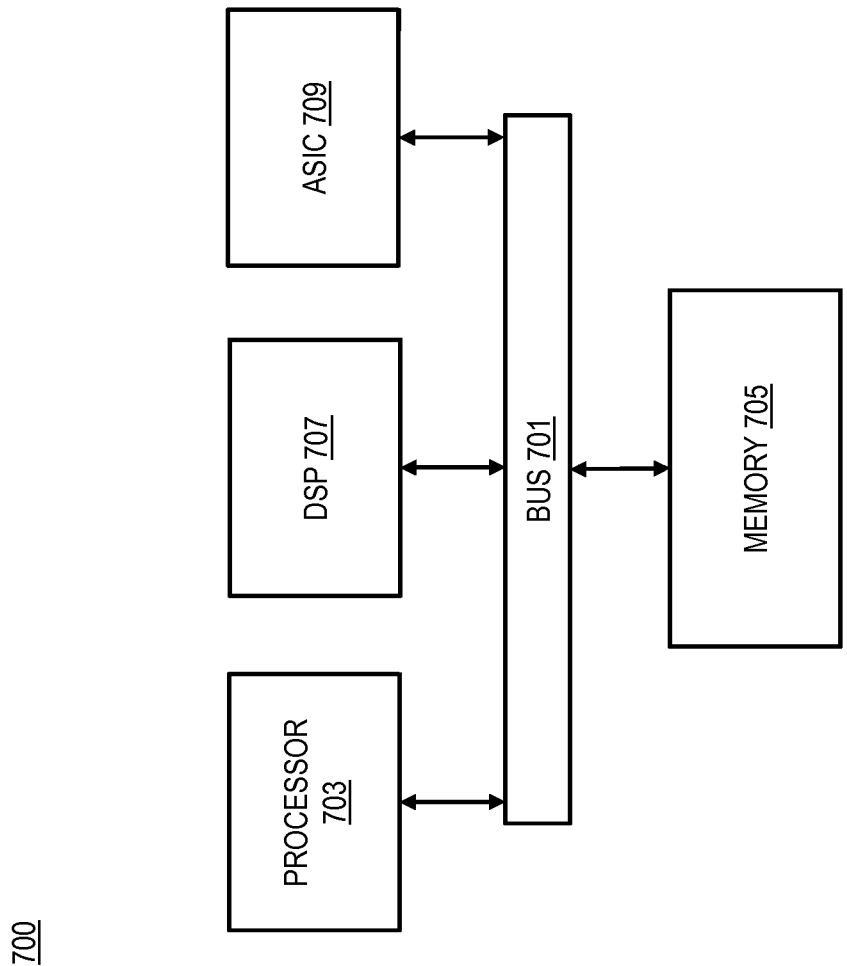
FIG. 7 is a diagram of a chip set that can be used to implement an embodiment of the invention.

FIG. 3 is a flowchart of a process for generating auditing specifications, according to one embodiment. In one embodiment, the privacy ratings platform 103 performs the process 300 and is implemented in, for instance, a chip set including a processor and a memory as shown in FIG. 7. In addition or alternatively, the privacy ratings client 107 may perform all or a portion of the process 300.

In step 301, the privacy ratings platform 103 determines use information associated with one or more applications executing on one or more devices. In one embodiment, the privacy ratings platform 103 determines the use information based, at least in part, on usage data associated with one or more input sources, one or more components, one or more categories of personal information, or a combination thereof associated with the one or more devices (step 303). By way of example, the use information includes, at least in part, one or more data access requests, one or more responses to the one or more data access requests, metadata associated with the one or more responses, or a combination thereof.

In step 305, the privacy ratings platform 103 processes and/or facilitates a processing of the use information to determine one or more privacy ratings for the one or more applications. In one embodiment, the privacy ratings platform 103 causes, at least in part, a segmentation of the use information according to one or more contexts (step 307). In this way, the privacy ratings platform 103 can determine the one or more privacy ratings with respect to the one or more contexts. In other words, the privacy ratings platform 103 may determine multiple privacy ratings for each context for each application. In one embodiment, the context includes or is based, at least in part, on one or more of the privacy metrics described above.

In another embodiment, the privacy ratings platform 103 determines compliance information for the one or more applications based, at least in part, on one or more privacy policies or other data access policies associated with the one or more devices (step 309). The privacy ratings platform 103 then determines the one or more based further on, at least in part, the compliance information. As described above, the compliance information may include information indication compliance and/or violations with the one or more policies operating at a particular device.

In one embodiment, the privacy ratings platform 103 determines the use information over one or more periods of time (step 311). This determination can be performed, for instance, continuously, substantially continuously, periodically, according to a schedule, etc. The privacy ratings platform 103 then uses the use information collected over time to cause, at least in part, an updating of the one or more privacy ratings over the one or more periods of time (step 313).

Once the privacy ratings are generated or computed, the privacy ratings platform 103 can determine to generate at least one visual representation of the one or more privacy ratings (step 315). In one embodiment, the representations may be presented when accessing an application store that lists the applications associated with the determined privacy ratings. In another embodiment, the privacy ratings platform 103 cause, at least in part, a visualization of the one or more privacy ratings that indicates, at least in part, one or more privacy impacts associated with the one or more input sources, the one or more components, the one or more categories of personal information, or a combination thereof. In yet another embodiment, the privacy ratings platform 103 can also cause, at least in part, a grouping of the one or more applications based, at least in part, on the one or more privacy ratings. In this way, the user can access application with similar privacy ratings more easily.

In some embodiments, the privacy ratings platform 103 can customize the privacy ratings for specific devices. More specifically, the privacy ratings platform 103 process and/or facilitate a processing of one or more characteristics of (a) at least one target device, (b) one or more environments in which the at least one target device operates, (c) the use information, or (d) a combination thereof to cause, at least in part, a scaling of the one or more privacy ratings for the at least one target device (step 317). The scaled privacy ratings can then be presented at the target device in place of the generic privacy ratings.

Figure 4:
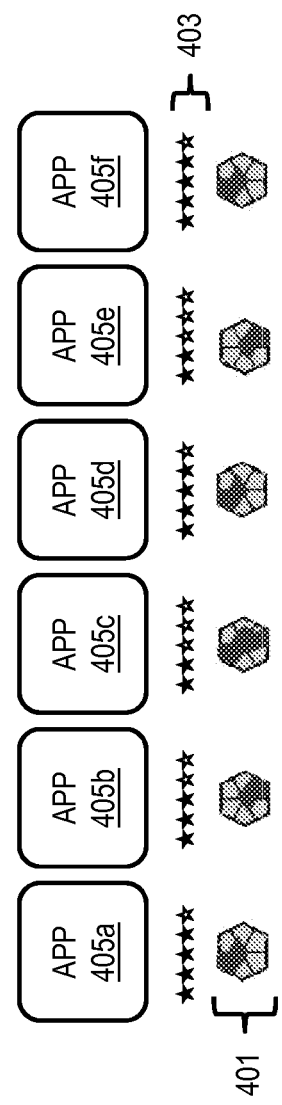
FIG. 4 is a diagram of a rendering of privacy ratings for applications listed in an application store, according to one embodiment.
Figure 5:
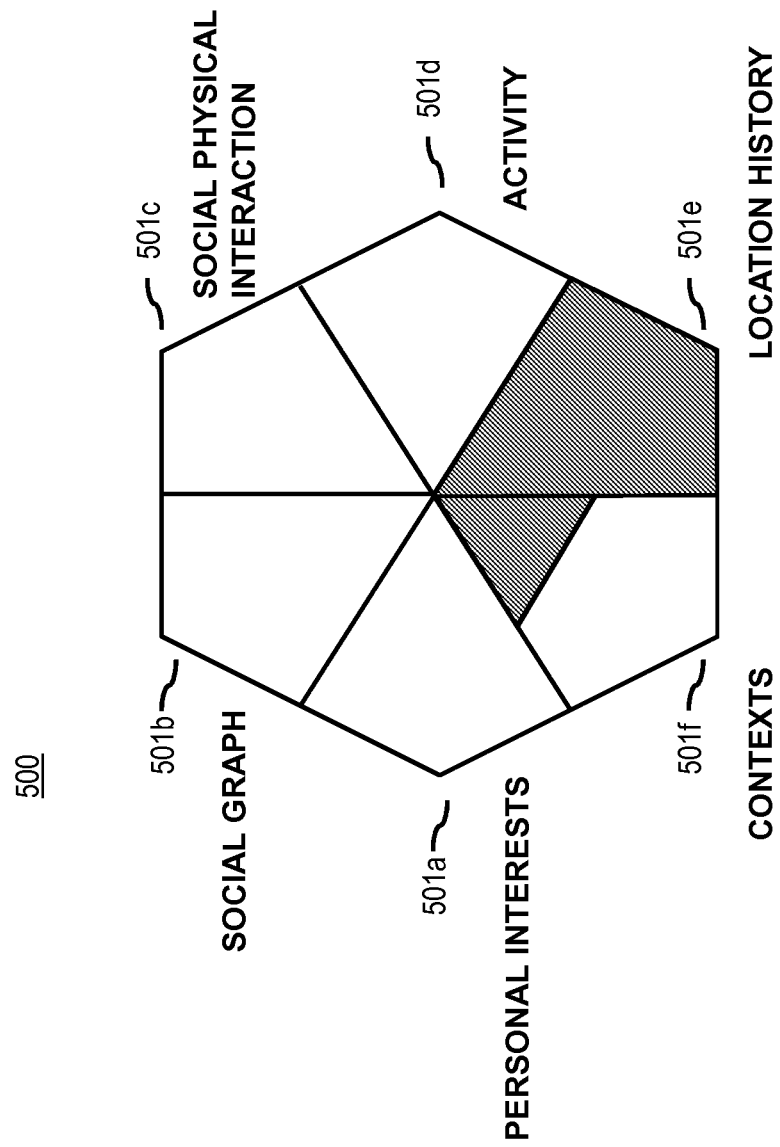
FIG. 5 is a diagram of a visualization of a privacy rating according to privacy impacts on input sources, components, categories of personal information, or a combination thereof associated with a device, according to one embodiment.

FIG. 4 is a diagram of a rendering of privacy ratings for applications listed in an application store, according to one embodiment. FIG. 4 is describe in conjunction with FIG. 5 which depicts a diagram of a visualization of a privacy rating according to privacy impacts on input sources, components, categories of personal information, or a combination thereof associated with a device, according to one embodiment. As shown in FIG. 4, the privacy ratings 401 computed by the privacy ratings platform 103 are displayed with other application related information 403 (e.g., quality ratings) for each application (e.g., applications 405a-405f) in an application store. In one embodiment (as shown in FIG. 5), the visual representation of a privacy rating is a circle graph 500 that is divided into equal sectors corresponding to the different categories of personal information (e.g., sector 501a for "Personal Interests", sector 501b for "Social Graph", sector 501c for "Social Physical Interaction", sector 501d for "Activity", sector 501e for "Location History", and sector 501f for "Contexts").

In one embodiment, the percentage that each sector is shaded represents a probability of that type of personal information being inferred based on the usage pattern demonstrated by a particular application. In some embodiments, the user has the option to of zooming into a specific sector of the graph to get more detailed information (e.g., privacy ratings for sub-categories, examples of the use information used to calculate the rating, etc.) corresponding to that personal information category. It is contemplated that any type of representation or visualization may be used to convey the privacy ratings and related information.

In one embodiment, the extent or presence of a shaded portion does not necessarily indicate that an application is malicious. Some applications depending on their functionality may actually need a more "privacy intrusive" usage pattern (e.g., to fulfill their functionality). So the displayed privacy ratings for the application should, in some embodiments, provide this information as well to the user. One option is for the privacy ratings platform 103 to compute a weighted privacy rating taking into account the "allowed" usage of an application (e.g., usage required by the application to fulfill its functionality). Such allowed usage for an application can be computed, for instance, as an average of the usage demonstrated by similar applications and/or belonging to the same category. The allowed usage of an application can also be displayed using a separate representation (e.g., color, shading, etc.) in the privacy ratings graph 500 of an application in the application store.

In another embodiment, the allowed usage information of the application, together with policies used by other users (including the application behavior with respect to compliance and/or violations of those policies) can be used to define default usage policies for new users.

The processes described herein for generating privacy ratings for applications may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
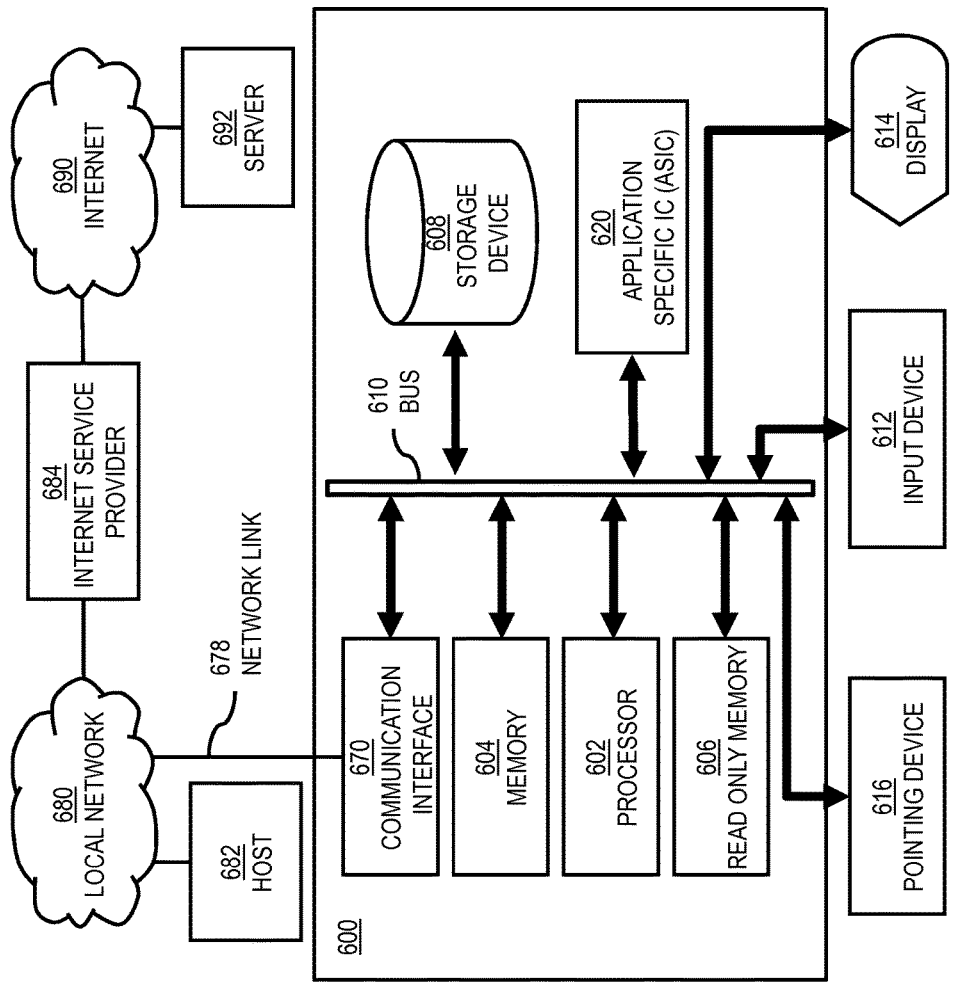
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.)

within FIG. 6 can deploy the illustrated hardware and components of system 600. Computer system 600 is programmed (e.g., via computer program code or instructions) to generate privacy ratings for applications as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of generating privacy ratings for applications.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to generating privacy ratings for applications. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for generating privacy ratings for applications. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for generating privacy ratings for applications, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for generating privacy ratings for applications.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to generate privacy ratings for applications as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of generating privacy ratings for applications.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to generate privacy ratings for applications. The memory 705 also stores the data associated with or generated by the execution of the inventive steps.

Figure 8:
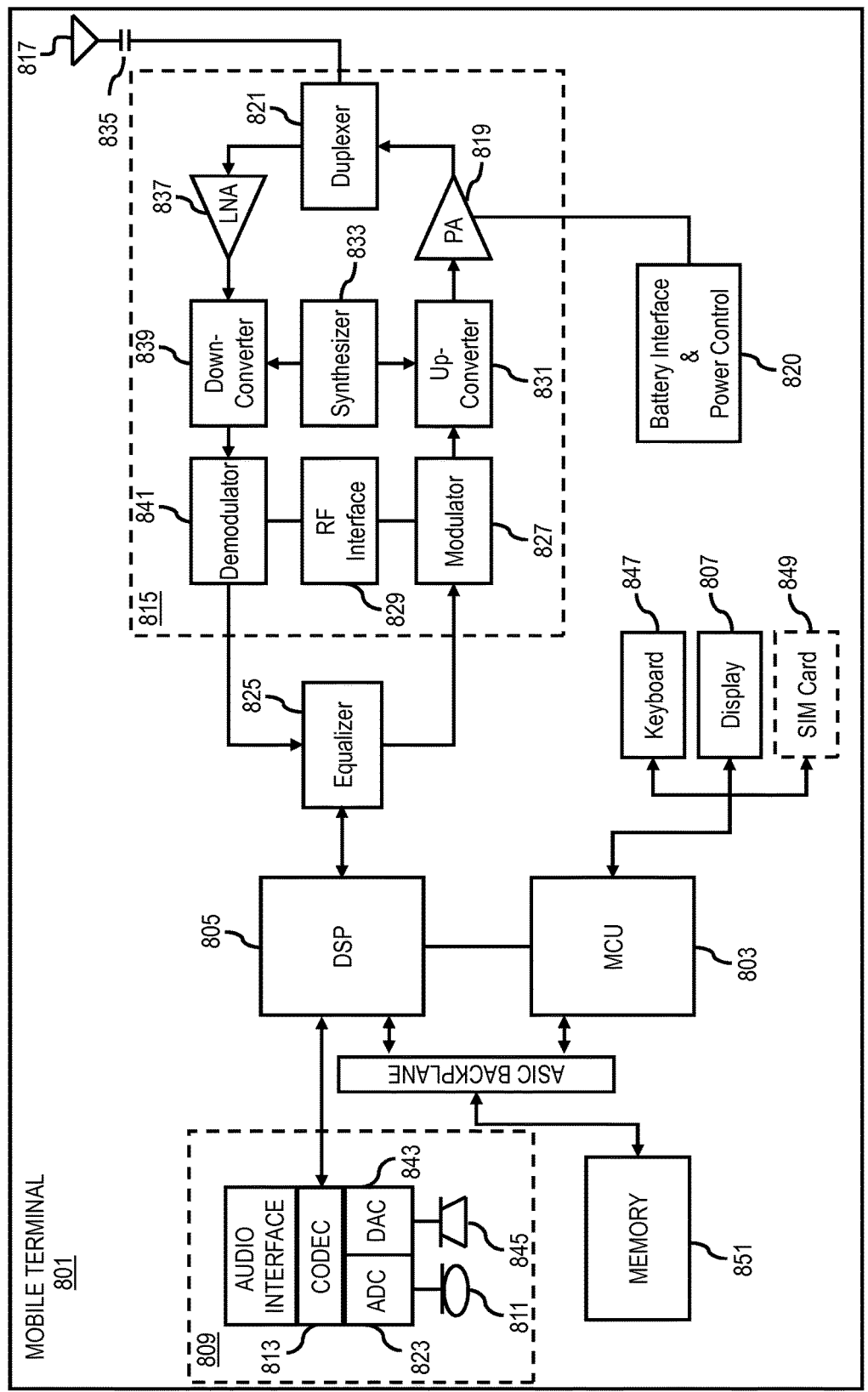
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of generating privacy ratings for applications. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of generating privacy ratings for applications. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to generate privacy ratings for applications. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   at least one determination of use information associated with one or more applications executing on one or more devices;
   a processing of the use information to determine one or more privacy ratings for the one or more applications;
   at least one determination of the use information over one or more periods of time; and
   an updating of the one or more privacy ratings over the one or more periods of time.

2. A method of claim 1, wherein the (1) data and/or (2) information and/or (3) at least one signal are further based, at least in part, on the following:
   at least one determination to generate at least one visual representation of the one or more privacy ratings.

3. A method of claim 1, wherein the (1) data and/or (2) information and/or (3) at least one signal are further based, at least in part, on the following:
   a grouping of the one or more applications based, at least in part, on the one or more privacy ratings.

4. A method of claim 1, wherein the (1) data and/or (2) information and/or (3) at least one signal are further based, at least in part, on the following:
   at least one determination of the use information based, at least in part, on usage data associated with one or more input sources, one or more components, one or more categories of personal information, or a combination thereof associated with the one or more devices.

5. A method of claim 4, wherein the (1) data and/or (2) information and/or (3) at least one signal are further based, at least in part, on the following:
   a visualization of the one or more privacy ratings that indicates, at least in part, one or more privacy impacts associated with the one or more input sources, the one or more components, the one or more categories of personal information, or a combination thereof.

6. A method of claim 1, wherein the (1) data and/or (2) information and/or (3) at least one signal are further based, at least in part, on the following:
   a segmentation of the use information according to one or more contexts; and
   at least one determination of the one or more privacy ratings with respect to the one or more contexts.

7. A method of claim 1, wherein the (1) data and/or (2) information and/or (3) at least one signal are further based, at least in part, on the following:
   at least one determination of compliance information for the one or more applications based, at least in part, on one or more privacy policies associated with the one or more devices,
   wherein the one or more privacy ratings are further based, at least in part, on the compliance information.

8. A method of claim 1, wherein the (1) data and/or (2) information and/or (3) at least one signal are further based, at least in part, on the following:
a processing of one or more characteristics of (a) at least one target device, (b) one or more environments in which the at least one target device operates, (c) the use information, or (d) a combination thereof to cause, at least in part, a scaling of the one or more privacy ratings for the at least one target device.

9. A method of claim 8, wherein the use information includes, at least in part, one or more data access requests, one or more responses to the one or more data access requests, metadata associated with the one or more responses, or a combination thereof.

10. An apparatus comprising:
at least one processor; and
at least one memory including computer program code for one or more programs,
the at least one memory and the computer program code configured to, with the at least one processor, cause the apparatus to perform at least the following,
determine use information associated with one or more applications executing on one or more devices;
process and/or facilitate a processing of the use information to determine one or more privacy ratings for the one or more applications;
determine the use information over one or more periods of time; and
cause, at least in part, an updating of the one or more privacy ratings over the one or more periods of time.

11. An apparatus of claim 10, wherein the apparatus is further caused to:
determine to generate at least one visual representation of the one or more privacy ratings.

12. An apparatus of claim 10, wherein the apparatus is further caused to:
cause, at least in part, a grouping of the one or more applications based, at least in part, on the one or more privacy ratings.

13. An apparatus of claim 10, wherein the apparatus is further caused to:
determine the use information based, at least in part, on usage data associated with one or more input sources, one or more components, one or more categories of personal information, or a combination thereof associated with the one or more devices.

14. An apparatus of claim 13, wherein the apparatus is further caused to:
cause, at least in part, a visualization of the one or more privacy ratings that indicates, at least in part, one or more privacy impacts associated with the one or more input sources, the one or more components, the one or more categories of personal information, or a combination thereof.

15. An apparatus of claim 10, wherein the apparatus is further caused to:
cause, at least in part, a segmentation of the use information according to one or more contexts; and
determine the one or more privacy ratings with respect to the one or more contexts.

16. An apparatus of claim 10, wherein the apparatus is further caused to:
determine compliance information for the one or more applications based, at least in part, on one or more privacy policies associated with the one or more devices,
wherein the one or more privacy ratings are further based, at least in part, on the compliance information.

17. An apparatus of claim 10, wherein the apparatus is further caused to:
process and/or facilitate a processing of one or more characteristics of (a) at least one target device, (b) one or more environments in which the at least one target device operates, (c) the use information, or (d) a combination thereof to cause, at least in part, a scaling of the one or more privacy ratings for the at least one target device.

18. An apparatus of claim 17, wherein the use information includes, at least in part, one or more data access requests, one or more responses to the one or more data access requests, metadata associated with the one or more responses, or a combination thereof.

* * * * *